United States Patent [19]
Haverkamp

[11] Patent Number: 5,846,363
[45] Date of Patent: Dec. 8, 1998

[54] METHOD FOR IMPROVEMENT OF THE BURGLAR-PROOFING OF GLASS WINDOWS AND GLASS DOORS WITH THE AID OF A TRANSPARENT LAMINATED SHEET

[76] Inventor: Ulrich Haverkamp, Emil-Nolde-Weg 39, 48165, Muenster, Germany

[21] Appl. No.: 682,091

[22] Filed: Jul. 17, 1996

[30] Foreign Application Priority Data

Jul. 24, 1995 [DE] Germany .................. 195 26 912.8

[51] Int. Cl.⁶ ............................................. C03C 27/12
[52] U.S. Cl. ................................. 156/106; 156/102
[58] Field of Search ............................. 156/102, 106

[56] References Cited

U.S. PATENT DOCUMENTS

| | | | |
|---|---|---|---|
| 4,075,802 | 2/1978 | Gross ................................. | 52/203 |
| 4,973,511 | 11/1990 | Farmer et al. .......................... | 428/216 |
| 4,985,099 | 1/1991 | Mertens et al. ....................... | 156/106 X |
| 5,131,967 | 7/1992 | Tweadey, II et al. ............... | 156/106 X |
| 5,153,062 | 10/1992 | Grolig et al. ........................... | 428/336 |
| 5,364,487 | 11/1994 | Friske et al. ......................... | 156/106 X |

FOREIGN PATENT DOCUMENTS

| | | |
|---|---|---|
| 157965 | 9/1988 | European Pat. Off. . |
| 2343349 | 3/1974 | Germany . |
| 2820061 | 11/1978 | Germany . |
| 3127721 | 2/1983 | Germany . |
| 3201687 | 9/1983 | Germany . |

*Primary Examiner*—Francis J. Lorin
*Attorney, Agent, or Firm*—Milde, Hoffberg & Macklin, LLP

[57] ABSTRACT

Method for retrofit improvement of the burglar-proofing of glass windows or glass doors, with the following process steps:

Placing together of three films of which the two outer films consist of transparent plastic material and the inner of polyvinyl butyral (PVB) and/or polyurethane (PU), to form a three-layer ply.

Heating of the PVB and/or PU (polyurethane) layer by thermal radiation before or after the placing together such that the film is placed in a plasticized state, at least on its outer face, and laminating the outer films with the inner film.

Fabrication of a laminated sheet in the form of a transparent sandwich of the three films by the application of pressure and the allowing of the sandwich to cool.

Joining of an existing glass pane in a glass door or glass window with a section of the laminated sheet, which is cut to the size of the glass pane and bonded to it.

12 Claims, 3 Drawing Sheets

METHOD FOR IMPROVEMENT OF THE BURGLAR-PROOFING OF GLASS WINDOWS AND GLASS DOORS WITH THE AID OF A TRANSPARENT LAMINATED SHEET

BACKGROUND OF THE INVENTION

The invention relates to the improvement, in particular by retrofitting, of the burglar-proofing of glass windows and glass doors, the existing glass pane being joined with a section of laminated film which is cut to the size of the glass pane and bonded to it.

The improvement of the burglar-proofing of glass windows or glass doors by bonding to them a laminated sheet which prevents the relatively brittle glass from shattering is known in the art. The application of a PET (polyethylene terephthalate) film and reinforcement of this film by plastic threads has already been proposed. This retrofit improvement, which is known in the art, prevents the shattered glass pane from collapsing: instead, the pieces of glass are held to the film for a certain period of time, thereby preventing the room from being penetrated immediately.

The drawback of this arrangement however is, as experience has shown, that the resulting glass fragments cut into the plastic film when the pane is subjected to a second strong shock or blow. Since for example a PET film possesses a relatively poor tear resistance, the second shock or blow generally results in the film being torn or split open by the fragmented glass, thereby permitting penetration. Reinforcing threads also provide no protection against such tearing resulting from a second shock or blow.

It is further known that PVB (polyvinyl butyral) and other transparent lamination materials, for example including polyurethane, are highly effective in laminated glass films, since these materials provide the films with a high tear and cohesive resistance. The disadvantage in this case is however that the use of PVB or polyurethane leads to difficulties in processing owing to the high adhesiveness of the film, even at roof temperature. Although PVB is commonly used in the manufacture of safety glass, by the inclusion of an intermediate PVB layer between finished glass panes and joining of the layers in an autoclave under high pressure and at high process temperatures, such a method is complex and expensive.

To our knowledge, no application has previously been declared for PVB or other film materials requiring processing in autoclaves, with their excellent characteristics, for retrofit improvement of the burglar-proofing of glass windows or glass doors.

SUMMARY OF THE INVENTION

The object of the invention is therefore the employment of PVB, polyurethane, or similar material with high tear and cohesive resistance for the improvement, by retrofitting or planned from the outset, of the burglar-proofing of glass windows and doors, without the entire glass pane having to be processed in an autoclave.

This is achieved in accordance with a first variant of the invention, by means of a method for retrofit improvement of the burglar-proofing of glass windows and doors, entailing the following process steps:

The placing together of three films, the two outer films consisting of transparent plastic material and the inner film of polyvinyl butyral (PVB) and/or polyurethane (PU) to form a three-layer ply;

Heating of the PVB and/or PU (polyurethane) film by thermal radiation before or after the placing together such that the film is placed in a plasticized state, at least on its outer face; and laminating the outer films with the inner film;

Fabrication of a laminated sheet in the form of a transparent sandwich of the three films, by the application of pressure and allowing to cool;

Joining of an existing glass pane in a glass door or glass window with a section of the laminated sheet cut to the size of the pane and bonded to it.

The above process steps are intended for application in the case of retrofit improvement.

In particular, the method is applied such that three films are joined, the two outer films consisting of transparent plastic material and the inner film of polyvinyl butyral (PVB) and/or polyurethane (PU), to form a three-layer ply, and that the three-layer ply is heated such that the PVB and/or PU (polyurethane) layer is heated by the penetration of the outer film(s) by thermal radiation and is placed in a plasticized state, and that subsequently a laminated sheet is fabricated in the form of a transparent sandwich of the three films.

If application of the method is intended from the outset and the glass pane not yet fitted, the following process steps are employed:

The placing together of two films, one of which (the outer film) consists of transparent plastic material and the other (the inner film) of polyvinyl butyral (PVB) and/or polyurethane to form a two-layer ply;

Joining of a glass pane with a section of the laminated sheet cut to the size of the glass pane and placed on the pane with the inner PVB and/or PU (polyurethane) film facing the pane;

Heating of the three-layer ply such that the PVB and/or PU (polyurethane) layer is heated by thermal radiation penetrating the outer film or the glass pane, and is placed in a plasticized state;

Fabrication of a transparent sandwich by the application of pressure and allowing to cool. Following or during performance of the above process steps, further layer sequences comprising a transparent film and a PVB and/or PU (polyurethane) layer can be added in addition to the laminated sheet.

The outer film(s) may also be tinted or possess a reflective coating. Said coating may be a laminated or sputtered metallic layer.

The use of a film fabricated according to said procedure steps ensures an the one hand that a PET film which possesses high-strength properties and which under normal circumstances can be penetrated only with difficulty is joined with a PVB film with its exceptional properties of tear resistance, so that glass panes to which this film is applied present substantially greater resistance than those to which a PET film alone is bonded. The same applies to similar combinations in which one of t he PET films is dispensed with.

Once joined, the film is preferably heated in a tunnel heated by infrared radiation.

The outer film, in particular the PET film , should have a thickness of between 0.03 and 0.5 mm, whereas the PVB and/or polyurethane films should have a thickness of between 0.01 and 0.3 mm respectively prior to heating and plasticization.

Once the film has been allowed to cool, it is preferably covered with an adhesive layer, preferably consisting of acrylate adhesive. This layer is covered in turn by protective paper (release liner). This release liner is then removed before the film itself is bonded, thereby providing an acrylate layer ready for bonding.

It is further recommended that one outer face of the laminate sheet be provided with a hard coat, i.e. a toughened layer, in order to increase the scratch resistance.

Furthermore, the laminated sheet can be provided with wire-like conductors at the interface between the PVB or polyurethane sheets and one of the PET sheets. These conductors form part of the conductor loop of an alarm circuit.

In the following embodiments the improvement of the burglar-proofing of a glass pane by retrofitting is described with reference to the drawings

DESCRIPTION OF THE PREFERRED EMBODIMENTS

The material is selected according to the criteria imposed by the situation in question. Tinted PET films are also used for example if desired, the PVB having a higher temperature of plasticization than that of transparent film used in cool climates.

Figure 1:
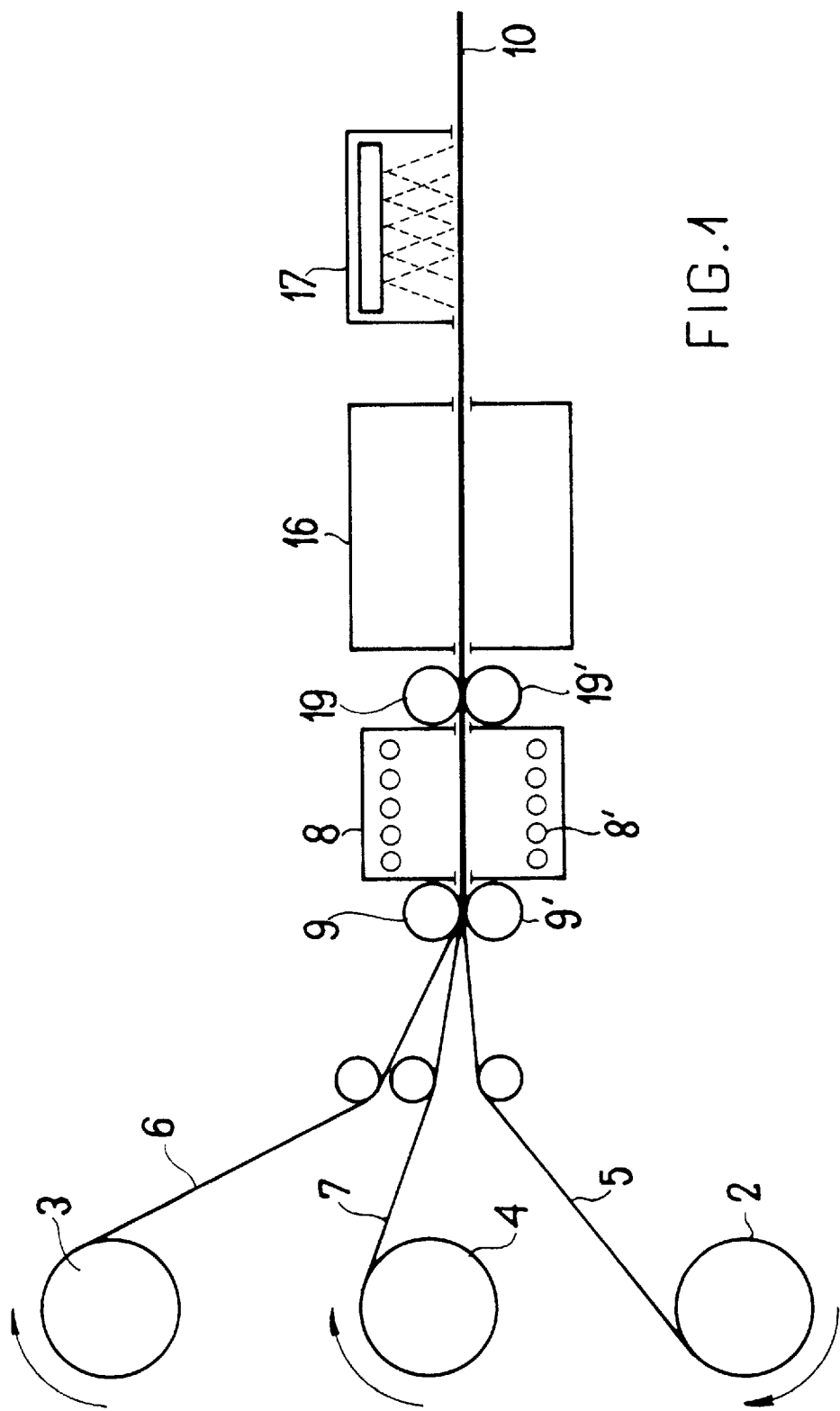
FIG. 1 is a schematic diagram of a first modification of the method.

EXAMPLE 1 (cf FIG. 1)

Film webs 5 and 6 from two stock rolls 2, 3 of a PET film with a thickness of 0.8 mm are used to manufacture a suitable laminated sheet 10. PET is the usual abbreviation for polyethylene terephthalate. The general formula is —(—O—CH2—CH2—O—CO—$C_6H_4$—CO—)-n, n lying between 80 and 180 and the molecular weight between 16000 and 35000.

A cooled film web 7 of a PVB film is further drawn off a stock roll 4. PVB is the usual abbreviation of polyvinyl butyral. A characteristic of this substance is its extreme adhesiveness at room temperature, as a result of which it must be processed with a protective polyethylene film or in a strongly cooled state. The PVB also has degassing striae, giving it an opalescent appearance. Without further processing, PVB is not suitable for the purpose stated above.

The film webs 5, 6 and 7 are guided together by guide rollers 9, 9' such that they are already in contact when they enter an infrared heating chamber 8. Thereby an initial adhesion is already achieved. In this chamber 8, infrared radiators 8' act upon the three-layer ply such that the PVB film is heated by the radiation, which penetrates the PET film, to 70° to 80° C., and is placed in a plasticized state.

Immediately upon leaving the heating chamber 8, the layers are pressed against each other and trapped air pressed out with the aid of press rollers. Following passage through the press rollers, a transparent sandwich of the three films is obtained. The sandwich is now allowed to cool in the cooling chamber 16 and is sprayed with acrylate adhesive in the treatment chamber 17.

The acrylate layer is then covered with a protective film (not shown). The underside of the sandwich can also be provided with a hard coat, as is known in the art of film treatment. Further, one of the outer films way be laminated with an adhesive layer before bonding.

Figure 2A:
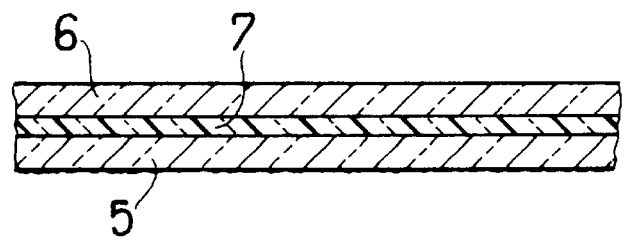
FIGS. 2a, b, 3 and 4 are different layer sequences of film and film/glass laminates.
Figure 3:
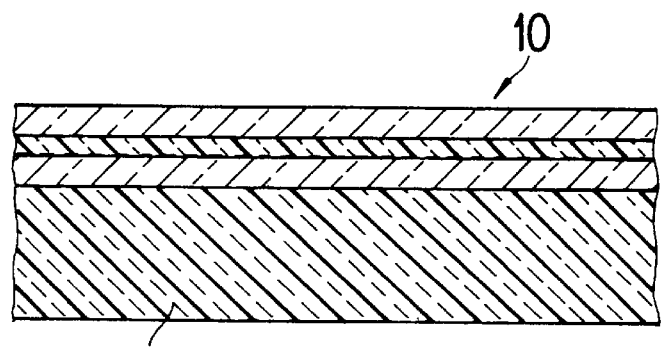

FIG. 2a shows a laminated sheet the upper and lower main layers of which consist of PET. The inner side (that facing into the room) is coated with a laminated sheet in accordance with the invention. A film of this type is applied according to FIG. 3 to a glass layer 1 by removal of the release liner on the adhesive layer and application of the film, ensuring that no air whatsoever is trapped. The side facing away from the glass surface is covered with a hard coat.

The film can also be provided with a very thin precious metal or aluminium coating on its inner face in order to achieve an infrared reflection effect, as a result of which solar radiation is reflected back outwards and thermal radiation from the room is reflected inwards during the cooler season.

Figure 5:
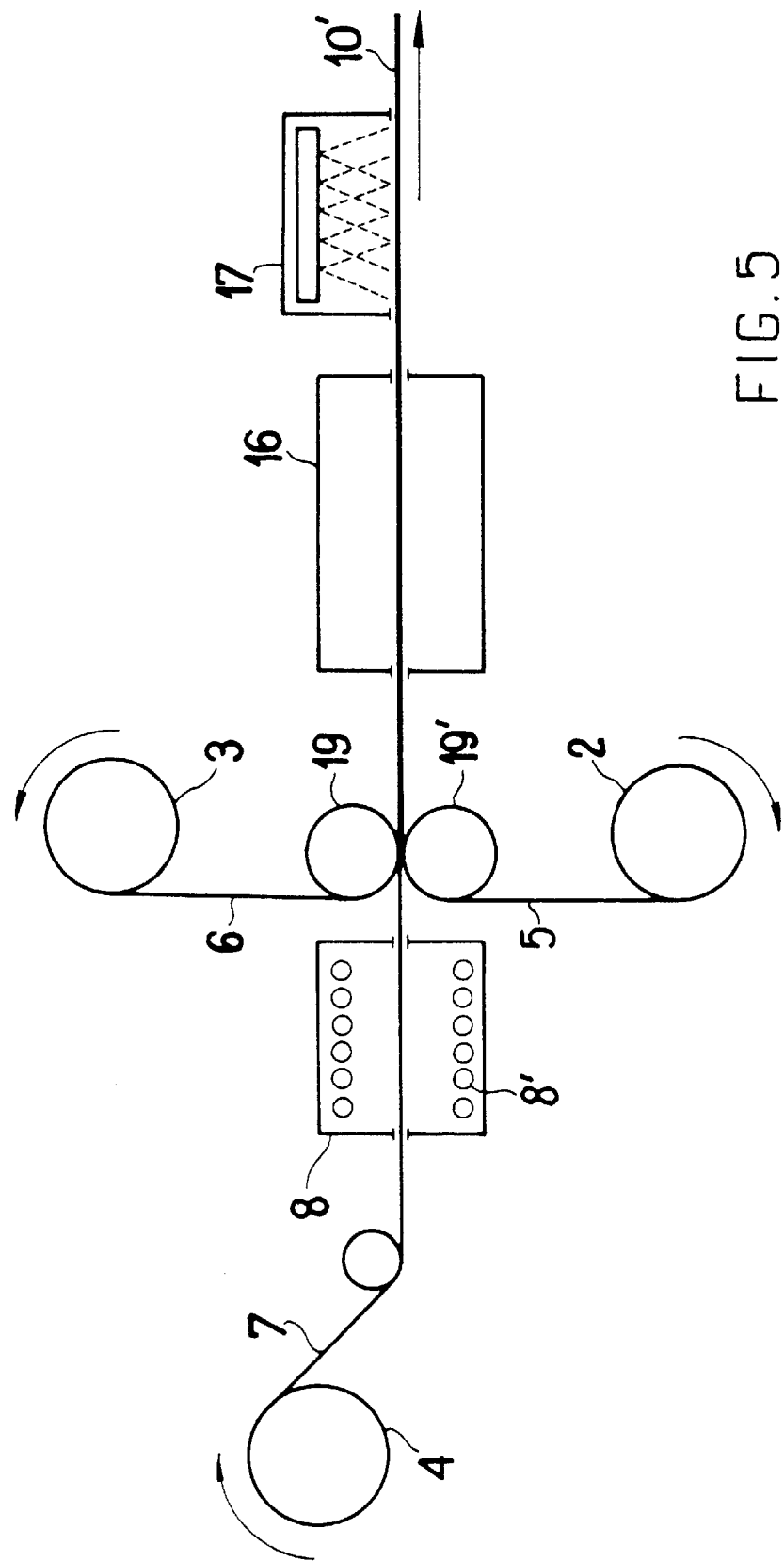
FIG. 5 is a schematic diagram of a second variant of the method

EXAMPLE 2 (cf. FIG. 5)

Film webs 5 and 6 from two stock rolls 2, 3 of a polycarbonate film with a thickness of 0.6 mm are used to manufacture a suitable laminated sheet 10'. The web 5 is already coated with an adhesive methacrylate-layer.

A film web 7 of a PVB film is further drawn off a stock roll 4. PVB is the usual abbreviation for polyvinyl butyral. The outer face of the PVB film is heated in an infrared heating chamber 8, causing it to begin melting. In this chamber 8, infrared radiators 8' act upon the film web 7 until it is heated to approx. 70° to 80° C. and placed in a plasticized state.

The film webs 5, 6 and 7 are guided into the lead-in slit between two cooled rollers 19 and 19' which cool the two film webs 5 and 6 sufficiently for them not to be physically changed by the heated file 7.

The rollers 19, 19', which are coated with an elastomer, press the layers together and expel any trapped air.

Following passage through the cooling and press rollers 19, 19', a transparent sandwich of the three films is obtained. The sandwich is now allowed to cool down in the cooling chamber 16 and is sprayed with acrylate adhesive in the treatment chamber 17. Said cooling chamber may be omitted if a sufficient cooling is performed by the cooling rollers.

The acrylate layer is then covered with a protective film (not shown). The underside of the sandwich can also be provided with a hard coat, as is known in the art of film treatment.

EXAMPLE 3

A glass pane 1 intended for a shop window with dimensions 1.20×2 m of float glass 5 mm in thickness is placed on a level surface and carefully cleaned on the face to which the laminated sheet is to be applied (the rear side in-situ). A cooled film web 7 of a polyurethane web with a thickness of 1.5 mm, inherently suitable as an intermediate layer and initially tacky and milky-opalescent, is drawn off a stock roll. The PU (polyurethane) web is placed from above on a polycarbonate web, to which it generates a light bond as soon as the double layer has reached room temperature.

Displaceable deflection and pad rollers are then used to place the double layer in two webs arranged face to face on the glass pane 1 such that the PU (polyurethane) web lies between the polycarbonate and the glass pane. The pane is then traversed by heated rollers and held at a temperature of around 135° C. by means of infrared heat radiators, all air pockets being carefully removed.

Figure 4:
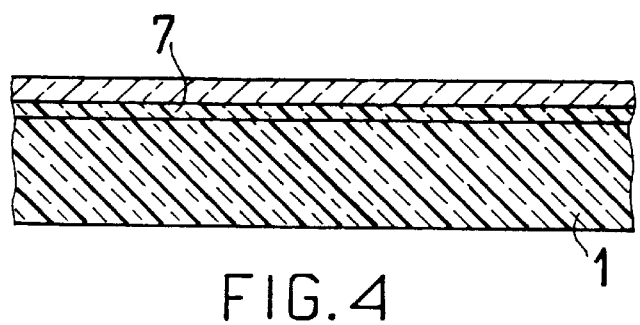

The pane is ready for fitting when cool (FIG. 4).

EXAMPLE 4

Figure 2B:
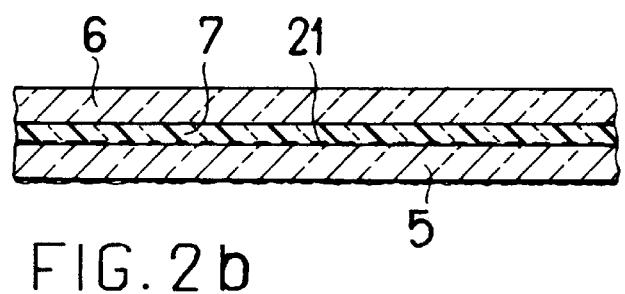

FIG. 2b shows an embodiment in which wire-like conductors 21 are inserted at the interface between the PVB film and one of the PET films, these conductors also being inserted as the films are placed together. The wire-like conductors, which have both a reinforcing and a conducting function, can act as a conductor loop in an alarm circuit.

Altogether, the method provides a means of joining high-strength PET films, with their exceptional lightfastness, with the toughness of PVB films, without the need for complex and expensive autoclave processes prior to or following coating of the glass pane in question.

There has thus been shown and described a novel method for improvement of the burglar proofing of glass windows and glass doors with the aid of a transaprent laminated sheet which fulfills all the object and advantages sought therefor. Many changes, modifications, variations and other uses and applications of the subject invention will, however, become apparent to those skilled in the art after considering the specification and the accompanying dawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Method for retrofit improvement of the burglar-proofing of glass windows or glass doors, with the following process steps:

Placing together of three films of which the two outer films consist of transparent plastic material and the inner of polyvinyl butyral (PVB) and/or polyurethane (PU), to form a three-layer ply, Heating of the PVB and/or PU (polyurethane) layer by thermal radiation before or after the placing together such that the film is placed in a plasticized state, at least on its outer face, and laminating the outer films with the inner film, Fabrication of a laminated sheet in the form of a transparent sandwich of the three films by the application of pressure and the allowing of the sandwich to cool, Joining of an existing glass pane in a glass door or glass window with a section of the laminated sheet, which is cut to the size of the glass pane and bonded to it.

2. Method according to claim 1, characterized in that three films are placed together, of which the two outer films consist of transparent plastic material and the inner film of polyvinyl butyral (PVB) and/or polyurethane, to form a three-layer sandwich, and that the three-layer sandwich is heated such that the PVB and/or PU (polyurethane) layer is heated by thermal radiation which penetrates the outer film(s), and is placed in a plasticized state, and that a laminated sheet in the form of a transparent sandwich of the three films is subsequently produced.

3. Method for improvement of the burglar-proofing of glass windows or glass doors, with the following process steps:

Placing together of two films, of which one film (the outer film) consists of transparent plastic material and the other (inner film) of polyvinyl butyral (PVB) and/or polyurethane (PU) to form a two-layer ply;

Joining of a glass pane with a section of the laminated sheet which is cut to the size of the glass pane and placed on the pane with the inner PVB and/or PU (polyurethane) film facing the pane;

Heating of the three-layer ply such that the PVB and/or PU (polyurethane) layer is heated by thermal radiation penetrating the outer film or the glass pane, and is placed in a plasticized state, Production of a transparent ply by means of pressure and allowing to cool.

4. Method according to claim 1, characterized in that further layer combinations consisting of a transparent film and a PVB and/or PU (polyurethane) layer are added to the laminated sheet.

5. Method according to claim 1, characterized in that the heating is performed in a tunnel heated by infrared radiation.

6. Method according to claim 1, characterized in that the outer film(s) has (have) a thickness of between 0.03 and 0.5 mm.

7. Method according to claim 1, characterized in that the PVB and/or polyurethane film has a thickness of 0.01 and 0.3 mm prior to plasticization.

8. Method according to claim 1, characterized in that the outer film(s) consist of polyethylene terephthalate (PET) or of polycarbonate.

9. Method according to claim 1, characterized in that the outer film(s) are tinted and/or covered with a reflecting coating.

10. Method according to claim 1, characterized in that an adhesive layer, preferably consisting of an acrylate adhesive, is applied to the laminated sheet prior to bonding with the glass pane.

11. Method according to claim 1, characterized in that a hard coat is applied to at least one of the outer films.

12. Method for manufacture of a laminated sheet according to claim 1, further characterized in that wire-like conductors, which can act as parts of conductor loops of an alarm circuit, are provided at the interface between the PVB and/or PU (polyurethane) film and (one of) the outer film(s).

* * * * *